Figure 1:
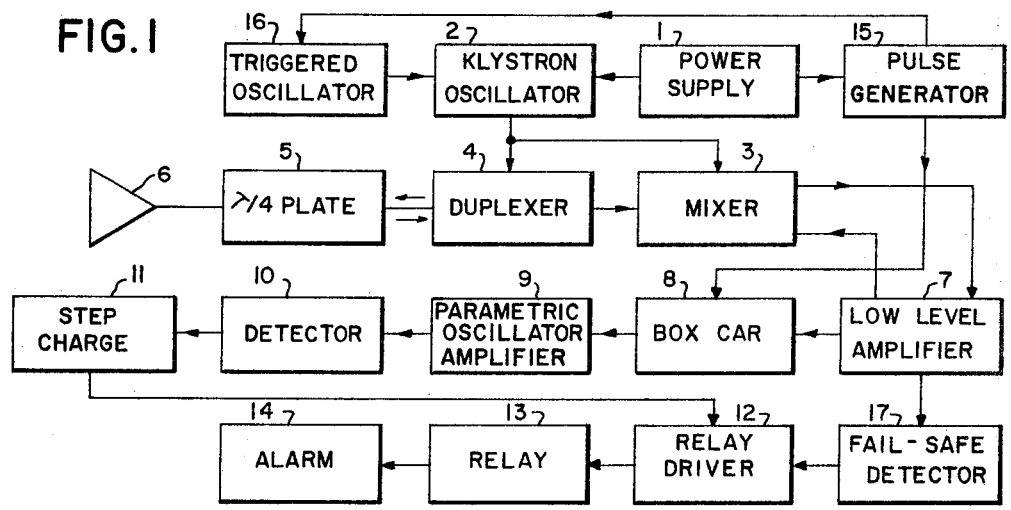

Aug. 30, 1966    A. H. McEUEN ET AL    3,270,339
INTRUDER ALARM SYSTEM
Filed Jan. 8, 1962    3 Sheets-Sheet 1

INVENTORS
ALBERT H. Mc. EUEN
RICHARD M. WHITEHORN
ROBERT E. DYE
EDWARD J. MURPHY

BY Harry E. Aine
ATTORNEY

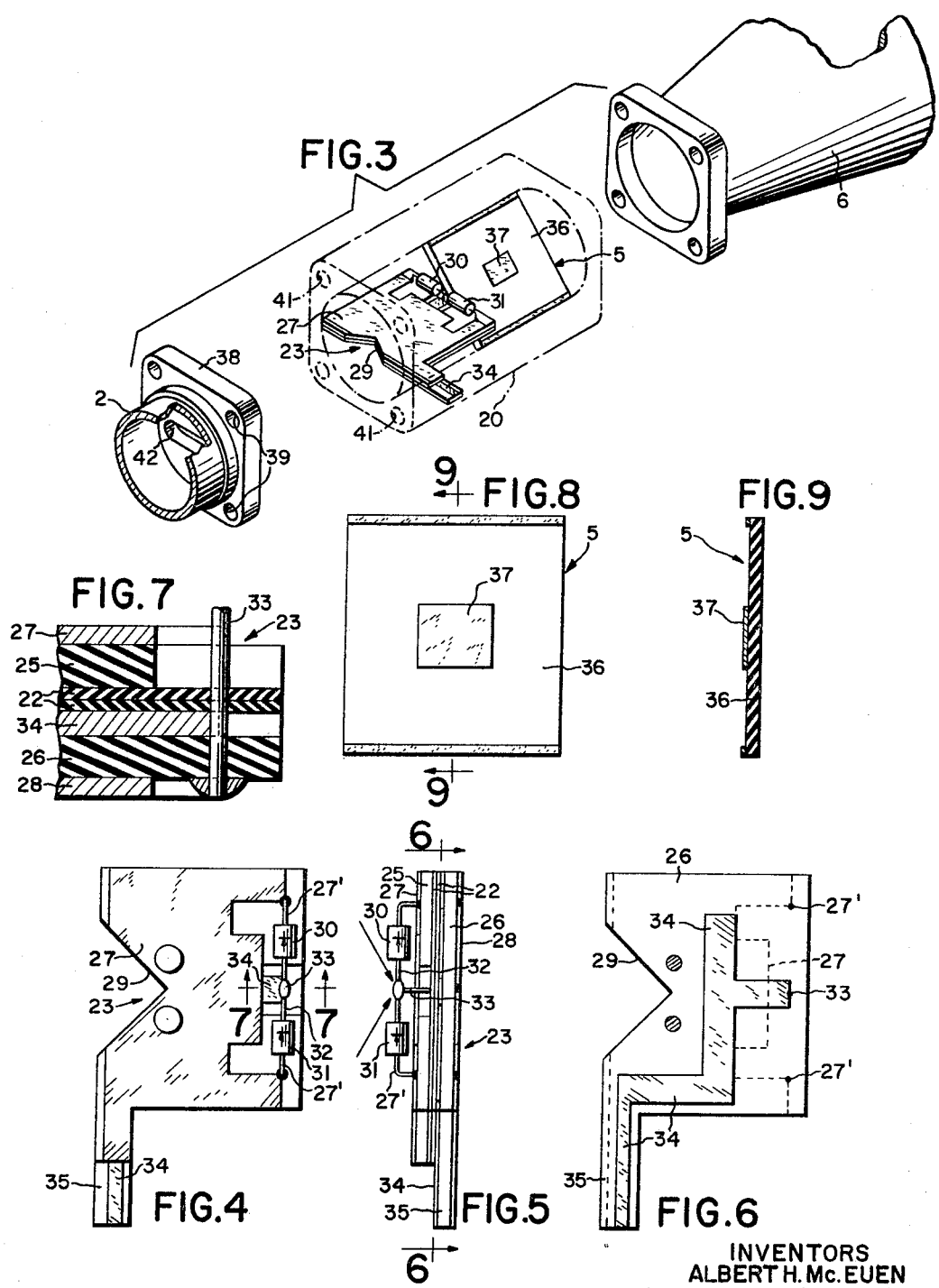

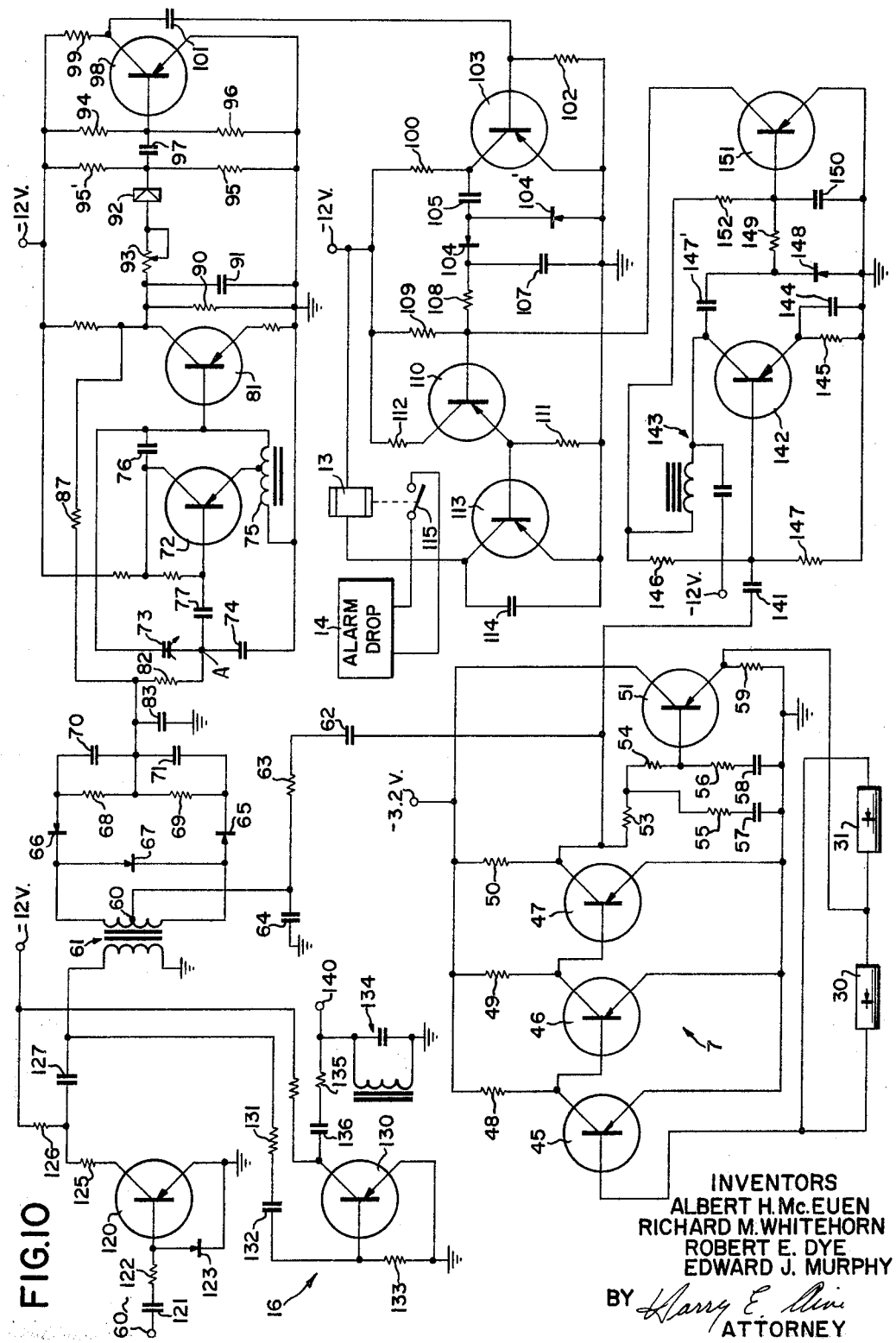

3,270,339
INTRUDER ALARM SYSTEM
Albert H. McEuen, Saratoga, Richard M. Whitehorn, Menlo Park, Robert E. Dye, Campbell, and Edward J. Murphy, Los Altos Hills, Calif., assignors to Varian Associates, Palo Alto, Calif., a corporation of California
Filed Jan. 8, 1962, Ser. No. 164,892
15 Claims. (Cl. 343—7)

The present invention relates in general to electronic detection systems and, in particular, to a high frequency electromagnetic wave intruder alarm system whereby persons and other objects moving in an area being monitored cause a transmitted CW wave to be reflected as a frequency modulated wave which is detected and utilized to activate an alarm device.

Known electronic intruder alarm systems can be grouped generally into two classes. The first class would include "disturbed field" devices which produce an electric field in or around an area to be protected. A sensitive receiver is used in conjunction with the transmitter to receive and measure the electric field. A variation in the electric field strength will result if an intruder or foreign object disturbs the electric field by entering within the field. The field variation may be easily detected by the receiver and used to trigger an indicator or alarm system.

The second class of electronic personnel detection devices would include those devices which transmit wave energy at a known CW frequency and compare the known transmitted frequency with the frequency of the wave energy reflected from persons or objects moving within the area being monitored. Any frequency change of the reflected wave energy, as compared to the transmitted energy, will indicate an object is moving within the area being monitored. This is the principle of operation of the well-known "Doppler" effect.

There are many variances and modifications on the above-named classes of detection devices. For example, the well-known "electric eye" or photoelectric circuit, detects an object crossing and blocking its beam path. The blocking object stops current flow from a light sensitive cell of the circuit, and this may be used to activate any number of desired functions.

The above-named intruder alarm systems have limitations or drawbacks. For example, the first-named "disturbed field" devices must have their receivers carefully and frequently adjusted and they must be readjusted whenever any new object is placed in the area being monitored, as a new object will cause a field variance. Often, two balanced receivers are used when larger areas are being monitored and these must be rebalanced regularly to insure proper operation of the system.

Doppler devices, which were previously used at sonic or ultrasonic frequencies, have drawbacks in that expensive transducers are needed to convert electrical energy to sonic energy and back again to electrical energy through receiving transducers. Complicated and expensive switching devices are also needed for operating the sonic Doppler system as a single transmit-receive transducer.

Low frequency electromagnetic Doppler devices have only a limited use in monitoring enclosed areas such as rooms, halls, etc., as low frequency electromagnetic wave energy will penetrate most wall surfaces and, therefore, will be unable to differentiate between movement in the area being monitored and movement in the surrounding area, for example, the next room, without the use of expensive shielding to reflect the low frequency electromagnetic energy.

Another drawback to many Doppler types of intrusion detectors (either sonic, supersonic, or electromagnetic) is the need for expensive and complex systems utilizing separate transmit and receive antennas or, if a single antenna is used, expensive duplexers are needed to protect the receiver from damage by the high power signal being transmitted.

It is the object of the present invention to provide a high frequency CW electromagnetic wave energy intruder alarm system whereby persons and objects moving in a predetermined area reflect frequency modulated wave energy signals which may be detected to announce the presence of said persons and/or objects.

One feature of the present invention is the use of a novel balanced mixer-duplexer assembly supported on a low-loss printed circuit card which is relatively inexpensive to manufacture and easy to assemble.

Another feature of the present invention is a novel orthogonal mode microwave hybrid junction wherein the junction connections are disposed in regions such that a straight-line joining said regions is spaced from the axis of the waveguide.

Another feature of the present invention is a novel microwave hybrid waveguide junction including a septum plane member disposed in the wave guide wherein the junction connections are disposed out of the plane of the septum.

Another feature of the present invention is a novel $\lambda/4$ (quarter-wave) plate used in combination with the above-mentioned mixer-duplexer which is supported on a low-loss printed circuit card and is relatively inexpensive to manufacture and easy to assemble.

Another feature of the present invention is a novel "Boxcar" circuit which samples the incoming signal at regular intervals and stretches the sampled signal at a substantially constant amplitude until receipt of the next sampled signal.

Another feature of the present invention is the utilization of a solid state parametric-oscillator-amplifier circuit having a high input impedance used in combination with a pulse-sampling and pulse-stretching circuit.

Another feature of the present invention is the use of a novel detector which produces quantized negative pulses when an input step-wave gradient exceeds a given amplitude.

Still another feature of the present invention is a novel fail-safe circuit wherein the transmitted electromagnetic wave energy is frequency modulated at regular intervals and the received frequency modulated fail-safe signal of the reflected wave energy is detected separately from the intelligence portion of the received signal.

Figure 2:
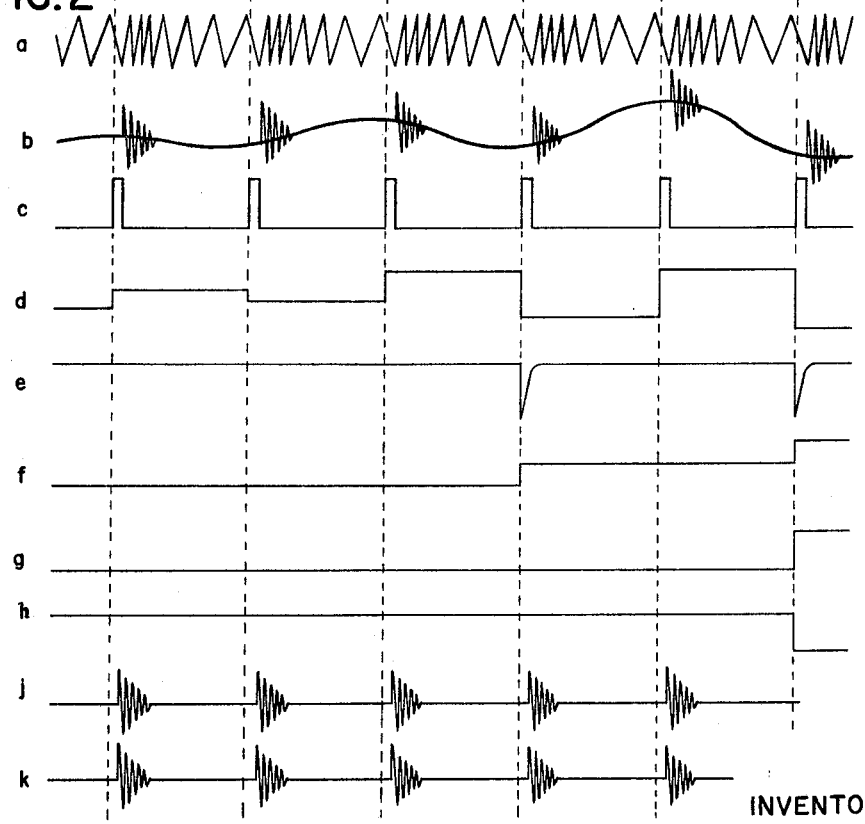

Other features and advantages of the present invention will become apparent upon a perusal of the following specification taken in connection with the accompanying drawings wherein:

FIG. 1 is a block diagram of a high frequency intruder alarm system in accordance with the present invention, FIG. 2, a–k, are a series of waveforms taken at different points throughout the intruder alarm system showing the electrical relation between given points in the system, FIG. 3 is an exploded perspective view showing the output of a klystron, the waveguide section, and a portion of the antenna horn, all in accordance with the present invention, FIG. 4 is a plan view of a balanced mixer-duplexer in accordance with the present invention, FIG. 5 is a right-hand side view of FIG. 4, FIG. 6 is a cross-sectional view of FIG. 5 taken at line 6—6 in the direction of the arrows, FIG. 7 is an enlarged fragmentary cross-sectional view of FIG. 4 taken at line 7—7 in the direction of the arrows, FIG. 8 is a plan view of a λ/4 plate used in the present invention, FIG. 9 is a cross-sectional view of FIG. 8 taken at line 9—9 in the direction of the arrows, and FIG. 10 is a schematic drawing of the circuitry of a portion of the block diagram of FIG. 1.

The novel intruder alarm system is shown in block diagram form in FIG. 1, and its associated waveforms shown in FIG. 2. The system comprises a power supply 1 for supplying the necessary power to the various components and circuits of the system, including a klystron oscillator 2. The klystron 2, for example, an X-band reflex klystron oscillator well known in the microwave art, produces a CW (continuous wave) frequency output directed into a predetermined area by an antenna 6, for example, a parabolic reflector or a horn type antenna. Waveform of FIG. 2a shows the CW wave output being frequency modulated at short, regular intervals. These frequency modulated pulses are the fail-safe signals and will be explained shortly. A mixer 3, duplexer 4, and λ/4 plate 5 are positioned between klystron oscillator 2 and antenna 6 so that a single antenna may be used for both transmitting and receiving the electromagnetic wave energy signals.

The CW electromagnetic wave energy transmitted from antenna 6 is directed into the predetermined area to be monitored. If no objects or persons are moving within this area, the signal waves reflected back to the antenna are unmodulated. These unmodulated reflected signals will produce a known level signal from the balanced mixer 3 in a manner to be fully described subsequently.

An intruder, when moving through the transmitted electromagnetic wave, will reflect a frequency modulated wave back to the antenna, where the reflected frequency modulated signal is compared with the known frequency of the transmitted signal. An IF (intermediate frequency) signal, proportional to the difference frequency will be fed as pulsating D.-C. (FIG. 2b) to a low-level amplifier 7. Low-level amplifier 7 is provided with a degenerative feedback path containing a low-pass filter (D.-C. to approximately 1.5 c.p.s.). The D.-C. signal is fed back through the mixer 3 to provide a D.-C. input bias to the amplifier input to maintain a stable operating level for the amplifier.

The amplified D.-C. signal is fed to a "Boxcar" or pulse-stretching circuit 8. Boxcar circuit 8 samples the output from amplifier 7 at regular (60/sec.) intervals. An electronic switch, triggered by a short pulse width wave train, FIG. 2c, from pulse generator 15 controls the sampling. The sampled signal portions are stretched, by a long-time constant network, at a constant amplitude (FIG. 2d) until the next signal portion is sampled.

A novel parametric-oscillator-amplifier circuit 9 provides a high input impedance solid state amplifier to amplify the output signal from "Boxcar" circuit 8. The high input impedance is needed to maintain the long-time constant output of the pulse-stretcher circuit which is fed into the parametric-oscillator-amplifier 9. The amplified "step-pulse" signal from amplifier 9 (an amplified version of FIG. 2d) is fed to a detector 10 which produces negative spike pulses (FIG. 2e) whenever the amplified "step-pulse" output signal exceeds a given amplitude from one pulse to the next. This detector acts as a guard against slowly or gradually rising increases from triggering the alarm.

Step-charge circuit 11 is controlled by the negative spikes produced by detector 10. As each negative spike (FIG. 2e) is fed into detector 10, an input switch associated therewith produces a positive charge (FIG. 2f) in circuit 11. Any chosen number of consecutive negative pulses, for example, 3, will cause the positive charges to build up to a threshold (FIG. 2g) to overcome the cut-off bias on a relay driver 12 which will, in turn, remove current (FIG. 2h) from relay 13 to activate alarm 14, for example, a bell, or a light or any other type of alarm desired. The number of negative pulses chosen above is determined by the degree of sensitivity desired as balanced against susceptibility of the system to false alarms.

A novel fail-safe system has been incorporated in the present radar device to insure maximum vigilance and reliance of the system. Power supply 1 supplies a 60 cycle signal to a synchronous pulse generator 15 which generates 60 cycle pulses (FIG. 2c) of very short duration. The front side of the pulses (FIG. 2c) closes the switch of the Boxcar circuit and the back side of the pulses opens the switch, as described above. The pulse-output from generator 15 is also fed to a triggered oscillator 16, triggered by the back side of the pulse generator output. Triggered oscillator 16 includes a low Q 4 kc. ringing circuit which decays at an exponential rate. The rapidly decaying oscillations from triggered oscillator 16 (FIG. 2j) are fed to the reflector of klystron 2. The variation in reflector potential causes a variation in frequency output (the fail-safe signal) from klystron 2 (FIG. 2a) as is well known. Since the frequency modulation is initiated timewise, on the back side of the pulse (FIG. 2c), the fail-safe signal will be blocked by the Boxcar circuit as the back side of the pulse opens the switch in the Boxcar. The fail-safe signal pulse (FIG. 2k) is fed, from amplifier 7 to fail-safe detector 17.

Fail-safe detector 17 includes a long-time constant circuit which provides a high potential bias signal that is recharged by the incoming fail-safe signal pulses. This high potential biases a detector to the off position. If the klystron ceases operation or fails in any manner, the detector would start to operate and produce an output signal which is fed to relay driver 12. This signal would cut off relay driver 12 and activate the alarm 14 as described above.

The balanced mixer-duplexer and λ/4 plate section, in accordance with the present invention, is best seen in FIGS. 3–9. A short cylindrical waveguide section 20 positioned between klystron 2 and a horn antenna 6 is formed by boring a rectangular block. Two pairs of opposing grooves are provided, as by machining, in the inner wall of waveguide 20. One pair of grooves is positioned such as to support a mixer-duplexer card 23 at the input or klystron end of waveguide 20. The second pair of grooves supports a λ/4 plate card 5 at the output end of waveguide 20 rotated 45° with respect to mixer-duplexer card 23.

Mixer-duplexer card 23 (best seen in FIGS. 3 to 7) comprises a pair of low-loss printed circuit boards 25 and 26, having their joining sides coated with a layer of Permacel Mylar 22. The two coated sides are joined securely together, as by riveting, for example. The outer surfaces 27 and 28 of cards 25 and 26 are metal coated and the edges fit into the grooves in the inner wall of waveguide 20 and serve as ground planes. The cards are cut back by a V-shaped indentation 29 at the klystron end of waveguide 20 in order to avoid presenting an unfavorable reactance to the klystron.

A pair of miniature diode crystal rectifiers 30 and 31 are connected at their end terminals to the ground plane 27 at 27' of the printed circuit card 25 of assembly 23. The common terminals 32 are joined at a junction 33 and connected to an internally mounted conducting strip 34 sandwiched between cards 25 and 26 and extending through the waveguide wall to provide the beat frequency output terminal 35.

A novel λ/4 wave plate is provided in the waveguide circuit to circularly polarize the electrical field from the klystron. The λ/4 plate comprises a single rectangular printed circuit card 36 of, for example, fiberglass laminate or some other low-loss material. A small strip of metal 37 is centered on one side of card 5 and is positioned to leave a quarter-wave of bare printed circuit card at either end to serve as a matching quarter-wave step into the metal coated center 37. Card 5 is inserted in grooves in the waveguide wall with its surface inclined 45° with respect to mixer supporting card 23.

Klystron 2 is supported on the input side of waveguide 20 by an output flange 38 provided with a plurality of holes 39 aligned with suitable holes 41 tapped in waveguide 20 for supporting bolts or some other means of securing the elements together. Klystron output flange 38 is provided with a suitable output iris 42 and positioned in alignment with waveguide 20 such that the electromagnetic wave energy propagated out of klystron 2 through iris 42, into waveguide 20, is polarized at right angles to the plane of mixer card 23 and the longitudinal axis of diode crystals 30 and 31. In other words, the klystron 2 feeds into the short section of circular waveguide 20 so that the electromagnetic field is vertically polarized. The metal surfaces 27 and 28 define a horizontal septum which isolates horizontally polarized reflex waves from the klystron 2. The asymmetrical disposition of the diode structure, defined by diodes 30 and 31 and leads 32, relative to the equipotential defined by the septum plane, defined by metal surfaces 27 and 28, establishes small components of the transmitted field in the polarization direction of the received field, said components being oppositely directed along the axes of the separate diodes 30 and 31, as shown by the arrows, to provide balanced operation. Also, it is to be noted that the diodes are off the axis of the circular waveguide where the unperturbed transmitted field of the waveguide field also has such components of the transmitted field. The mixer diodes 30 and 31 are supported horizontally across the guide, closely adjacent to the metal surface 27 of mixer 23, so that the diodes 30 and 31 couple very little power from the klystron 2 field. Diodes 30 and 31, however, are slightly displaced from the guide center, such that a small amount of the klystron field is coupled (about −15 db).

On the output side of waveguide 20, λ/4 plate 5 is positioned, rotated about the center axis of waveguide 20 on a plane 45° with respect to mixer card 23, as was previously described. λ/4 plate 5 is also positioned 45° with respect to the polarized klystron field. λ/4 plate 5 converts the vertically polarized klystron field into a circularly polarized wave, since the linearly (vertically) polarized wave is split into two perpendicular components, one of which is retarded by a quarter-cycle with respect to the other.

This circularly polarized wave is transmitted into the desired area via an antenna 6, for example, a horn, which is secured to the output side of waveguide 20 by suitable means, for example, a flange similar to flange 38. This radiated energy from the antenna 6 is returned to the antenna 6 as reflected wave energy. The reflected wave energy will be frequency modulated by a moving intruder or foreign object, in accordance with the well-known Doppler theory. Stationary objects located in the area being monitored will reflect energy at the same frequency as the transmitted energy. All reflections are returned as circularly polarized waves with a rotational sense opposite to that of the transmitted wave. Upon passing back through antenna 6, the circularly polarized wave is converted by the λ/4 plate into a horizontally polarized field, that is, parallel to the longitudinal axis of diodes 30 and 31. This couples the reflected waves with maximum effectiveness to the horizontally oriented diodes 30 and 31.

The mode pattern of the coupled klystron field which provides the local oscillator excitation will be out-of-phase. That is, the wave energy is coupled in opposite directions to the diodes 30 and 31. The reflected wave energy will be coupled to the two diodes in-phase. Thus, the output from the common junction of the two crystal diodes will provide a signal corresponding to the difference in the crystal diode currents. Since the received fields are in the same direction at each crystal, this signal output from the diodes will have a beat frequency equal to the difference in frequency between the transmitted waves and reflected waves. Thus, a difference in frequency between the received wave energy and the transmitted frequency wave energy is an indication of an intruder or moving object in the area being monitored.

FIGURE 10 shows all of the electronic circuitry shown in block diagram form in FIG. 1, necessary for operation of the present invention with the exception of the power supply. The power supply used with the present system is standard in every respect. The power supply provides 150 volts of reflector voltage, 260 volts resonator supply and 6.3 volts A.-C. heater voltage for klystron 2, and 12 volts A.-C. for most of the remaining components in the circuit. Also provided is a −12 v. voltage supply and a −3.2 v. power supply for the low-level amplifier circuit.

The output from the crystal diodes 30 and 31 is connected to the low-level amplifier 7 comprising three transistor amplifiers 45, 46 and 47 with their associated collector resistors 48, 49 and 50.

The output from the three stage low-level amplifier is fed to a low pass (D.-C.) filter network comprising resistors 53, 54, 55 and 56 and capacitors 57 and 58. Filter networks of this type may easily pass D.-C. but will include A.-C. up to 1 to 2 c.p.s. This low-pass (D.-C.) signal is used as degenerative feedback to stabilize the bias to the input of the low-level amplifiers via emitter follower transistor 51 including emitter resistor 59. Emitter follower 51 produces a high output impedance for the filter network and a low impedance from the amplifier input side and the center tap of diodes 30 and 31.

The reason for the low-pass filter network is to prevent false alarms due to gradual amplitude changes in the klystron. Slight amplitude changes are detected as low frequency A.-C. signals or pulsating or rising D.-C. This gradual rise in D.-C. or low frequency A.-C. is coupled as feedback to the amplifier input to maintain a constant D.-C. bias.

The output signal from the low-level amplifier 7 is also fed to the Boxcar circuit including a center tap 60 in the secondary of a transformer 61 via D.-C. blocking capacitor 62 and a high frequency bypass network comprising resistor 63 and capacitor 64. Diodes 65, 66 and 67, normally open, serve as an electronic switch to sample, at a 60/sec. rate, the signal output from the three stage low-level amplifier. A wave train of positive short pulse width pulses at a 60/sec. rate (FIG. 2c) is fed across the input of transformer 61 from the synchronous pulse generator 15 (to be explained in detail shortly). These pulses cause the normally nonconducting diodes 65, 66 and 67 to conduct. When these diodes conduct, they act as a closed switch and sample the amplifier output signal. The sampled pulse is stored in a long-time constant circuit comprising resistors 68 and 69 and storage capacitors 70 and 71. This circuit acts to stretch the sampled pulses so as to maintain their amplitude at a near constant level until the signal is again sampled.

An added feature of the Boxcar circuit is that it acts like a very narrow band 60, 120, 180 . . . n 60 cycle elimination time filter. This becomes important as many embodiments of the intruder alarm system may contain fluorescent light fixtures by way of example, which produce reflections with a large 120 cycle fluctuation. The present Boxcar eliminates these fluctuations with essentially no attenuation of nonsynchronized signals. The reason the Boxcar circuit eliminates the fluctuations is that it samples the input signal at a 60 cycle rate and therefore, will sample the same portion of the fluctuation every time since it too is a multiple of 60 cycles.

The output of pulse-stretching (or Boxcar) circuit is provided with a high input impedance in order to maintain the long-time constant in the pulse-stretching circuit. It is desirable to use solid state devices throughout the system for maintenance of low weight, low power consumption, high reliability and small size. As it is inherent in solid state devices to have low input impedances, a novel high input impedance parametric-oscillator-amplifier circuit is used.

The basic circuit comprises a bridge formed by a voltage controlled diode capacitor 73, capacitor 74 and the tapped inductor 75. The collector of transistor amplifier 72 is connected as a common terminal to the top of voltage controlled diode 73 and the voltage or top side of inductor 75 via capacitor 76. The base electrode of transistor amplifier 72 is connected to the junction of capacitor 74 and voltage controlled diode capacitor 73 via capacitor 77. Amplifier 72 output current flows through the upper portion of inductor 75. If the capacitance of diode capacitor 73 is large, corresponding to a small bias on diode capacitor 73, circuit feedback is negative. If the bias on diode capacitor 73 is raised, so as to lower the value of capacitance, a point will be reached where the feedback becomes positive and the circuit will oscillate at a frequency $$\omega^2 = \frac{1/c + 1/vc}{L}$$

where $c$=capacitance of capacitor 74, $vc$=capacitance of diode capacitor 73 and $L$=inductance of inductor 75.

When the circuit oscillates, the average value of the capacitance of diode capacitor 73 increases even though the average bias remains constant. The amount of positive feedback is thereby reduced as the level of oscillation increases and the amplitude of oscillation is stable even if amplifier 72 is linear. As bias is increased beyond the start oscillation point, the level of oscillation increases in proportion to the excess bias until other non-linearities limit the increase. The input looking into junction A is approximately $10^9$ ohms and the circuit gives a gain of $\approx 150$ (−3 db at 1 c.p.s. and 500 c.p.s.). Bias point stabilization for the parametric-oscillator-amplifier is supplied via resistor 82 and input capacitor 83 which together form a low-pass filter resistor which isolates the high frequency circuits from the input capacitor of the parametric-oscillator-amplifier.

The output from amplifier 72 is detected by transistor 81 and developed across resistor 90 and capacitor 91, and fed into a tunnel diode detector 92 through a variable current limiting or controlling resistor 93. Variable resistor 93 acts as a sensitivity regulator for the system by controlling the amount of signal needed for tunnel diode 92 to detect the presence of an output signal from the parametric-oscillator-amplifier circuit. This may be best explained by referring to FIGS. 2d and 2e. FIGURE 2d shows the step output from the parametric-oscillator-amplifier. When the step gradient raises above a chosen level, as controlled by potentiometer 93, the current passing through tunnel diode 92 reaches the tunnel diodes' critical negative resistance level and the voltage output immediately jumps to a higher level. When the current drops again to a level below the tunnel diodes "valley," the voltage drops sharply. Both of these operations occur in tunnel diodes in a known manner. A voltage divider network comprising resistors 95 and 95' provides current bias through the diode 92.

The output from tunnel diode 92 is fed through a high pass capacitor 97 which blocks low frequency components of the signal. The signal is amplified by transistor 98 which is biased by resistors 94 and 96 to near cutoff so that the positive pulses from tunnel diode 92 are clipped. Amplifier 98 only passes and amplifies the negative pulse output (FIG. 2e) from tunnel diode 92. Resistor 99 acts as an amplitude load resistor. Capacitor 101 and resistor 102 provide another high freqeuncy coupling network to further suppress low frequency signals.

The step-charge circuit comprises transistor switch 103, which serves as a normally open switch which closes when an output pulse from amplifier 98 is developed across resistor 102. Transistor 103 produces a positive going pulse developed across resistor 100 which is stored on capacitor 107 through coupling capacitor 105 and diode 104. Diode 104' allows the capacitor 105 to return to ground potential. Capacitor 107 and its associated circuit resistors 108 and 109 have a large enough time constant such that it can store the sum voltage from consecutive pulses, three, for example, passing through the input switch. When these three consecutive pulses of sufficient amplitude pass through the input switch in a relatively short time interval, short enough to offset the time decay of capacitor 107 and its network, sufficient threshold voltage is built up on storage capacitor 107 to bias normally conducting transistor 110 to cutoff. When transistor 110 cuts off, voltage across emitter electrode reistor 111 goes to ground which biases normally conducting transistor 113 to cutoff position. When transistor 113 cuts off, collector current stops passing through the solenoid of relay 13 and opens switch 115 to sound alarm 14.

It is noted that alarm 14 may be a bell, light, buzzer or any other alarm or indicating device, as desired.

The novel fail-safe circuit of the present invention basically comprises generating a signal which will frequency modulate the transmitted signal output from the klystron to send a synthetic intrude signal through the entire system for the purpose of assuring satisfactory operation of the system. If any part of the system fails, the synthetic signal will not be transmitted to the detector at the terminal station. The absence of the synthetic signal will trigger the alarm 14 to announce that the system is not operating satisfactorily. The synthetic signal has a narrow spectrum lying well outside of the expected spectrum of intruder signals.

The synthetic signal is controlled by a synchronous pulse generator signal comprising transistor 120 and its associated circuitry. The 60 c.p.s. line input for the system power supply is fed across a coupling capacitor 121 and resistor 122. On the positive going cycle, negative limiting diode 123 closes, placing the base electrode of transistor 120 at ground potential, cutting off the device. When the 60 c.p.s. input signal swings through its negative cycle, diode 123 opens and the transistor 120 begins to conduct. Load resistor 126 provides a positive train of narrow wave pulses (see FIG. 2c). This wave train is fed across the primary of transformer 61 via capacitor 127 to trigger the Boxcar circuit as previously described. The positive pulses are also fed to the triggered oscillator 16.

The triggered oscillator comprises transistor switch 130, normally cut off. When the negative portion of the signal from the synchronous pulse generator is fed through resistor 131 and coupling capacitor 132, a negative signal is developed across base resistor 133 and switch 130 conducts, causing a sharp pulse to be applied to a low Q, L-C tank or resonant circuit 134. The negative going side of the pulses from the wave train closes switch 130 and this pulse will trigger resonant tank circuit 134 into oscillation in the known manner of "ringing circuits."

Damping resistor 135 along with the low Q circuit 134 causes the ringing or oscillations to dampen sharply at an exponential rate, producing a series of 4 kc. ringing pulses similar to those shown in FIG. 2j. The 4 kc. output signal from ringing circuit 134 is supplied to the reflector of the klystron oscillator 2 via output 140.

The frequency output from reflex klystrons is partially dependent upon the reflector voltage, as is well known in the art. When the 4 kc. signal pulses reach the klystron reflector (at a 60 c.p.s. rate) the output of the klystron is frequency modulated at a 4 kc. rate. The reflected frequency modulated signal acts as a reflected synthetic signal. The reflected synthetic signal is fed from mixer 3, through low-level amplifier 7 to fail-safe detector 17. It is noted that the switch of the Boxcar circuit which samples the reflected signal will be open when the synthetic signal arrives. This is because the switch, comprising diodes 65, 66 and 67, is closed by the positive side of the pulse output from the synchronous pulse generator 15 and open by the negative going side, while the ringing circuit 134 is excited by the negative going side of the synchronous pulse.

The synthetic 4 kc. output from the three-stage amplifier 7 is fed through coupling capacitor 141 to the base of transistor 142 of the 4 kc. detector circuit. Transistor 142 includes a 4 kc. resonant tank 143 in its collector circuit which presents a tuned load to the 4 kc. synthetic signal from amplifier 7. Transistor 142 also includes an A.-C. bypass capacitor 144 and a biasing resistor 145 in its emitter circuit. Resonant tank circuit 143 produces a large voltage swing whenever a 4 kc. signal is supplied to the base electrode. The base is returned to the collector supply through large resistor 146 which holds the base slightly negative when no signal is applied. The applied signal is developed across base resistor 147.

The large voltage swing builds up on capacitor 147' and is detected by diode 148. Diode 148 builds up a D.-C. potential, coupled by resistor 149 to storage capacitor 150, in the base circuit of transistor 151. Transistor 151 is held in a normal cutoff position by the potential stored on capacitor 150. This potential is recharged at 60 c.p.s. by the incoming synthetic signal. If, in the event of a failure of any part of the circuit, the synthetic signal was cut off, the potential on capacitor 150 would bleed off through large resistor 152, causing transistor 151 to conduct and bias normally conducting transistor 110 in the relay drive to cutoff position and thus cause the alarm to be sounded, as was previously described.

It is noted that an intruder moving in the area being monitored would modulate the wave energy at approximately 250 c.p.s. maximum, and this relatively low frequency signal will not cause a sufficiently large signal to be built up in the tank circuit of transistor 142 to be detected. Only the modulated carrier will contain intrusion information, which is separately detected and utilized to sound the intrusive alarm.

A full and complete disclosure and description of the theory of operation of the mixer-duplexer described in this application is found in U.S. Patent 3,066,290, assigned to same assignee.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a high frequency electromagnetic wave energy intruder alarm system; means for generating electromagnetic wave energy; means for simultaneously radiating and receiving reflected wave energy; means for coupling wave energy from said wave energy generating means to said radiating means; said radiating and receiving means radiating the wave energy into a region of space to be monitored and receiving reflected wave energy therefrom; said radiating and receiving means including, a mixer-duplexer assembly for mixing the generated wave energy with said reflected wave energy to detect any difference frequency between the radiated frequency and the reflected wave energy thereby to produce an audio beat frequency output signal; and an intruder alarm device actuated by said output signal to announce the presence of an intruder in the monitored region, wherein said coupling means for coupling wave energy from said wave generating means to said radiating means includes a hollow waveguide having a central longitudinal axis disposed between said generating means and said radiating means; said mixer-duplexer assembly comprising an electrically conductive member disposed in said waveguide in a plane normal to the polarity of the electric field of the wave energy output from said generating means, and a pair of diode rectifiers having a common terminal and outer terminals collinearly mounted on said conductive member and being disposed perpendicular to the polarity of the electric field and being located within said hollow waveguide such that a straight-line interconnecting said diodes passes off the central longitudinal axis of said hollow guide to permit coupling of a portion of the output from said generating means as a local oscillator signal.

2. The system according to claim 1 wherein said conductive member comprises a printed circuit member including a pair of outer plane surfaces and a center conductor insulated from said surfaces, said center conductor communicating with the common terminal of said diode rectifiers to serve as the beat frequency output terminal.

3. The system according to claim 2 wherein the inner walls of said waveguide are provided with a plurality of mutually opposing, longitudinally directed grooves, a first pair of said mutually opposing grooves for mounting said shielded member in a plane normal to the polarity of the electric field, and said outer plane surfaces communicating with the outer terminals of said rectifiers to provide a ground plane for said rectifiers.

4. The system according to claim 3 further including a quarter-wave plate disposed in said waveguide for circularly polarizing the electric field output from said generating means; a second pair of said mutually opposed grooves securing said quarter-wave plate on a plane rotated about the central axis of said waveguide 45° with respect to the plane of said printed circuit member.

5. In a high frequency electromagnetic wave energy intruder alarm system; radio frequency generating means for producing electromagnetic wave energy; means for simultaneously radiating wave energy and receiving reflected wave energy, means including a hollow waveguide for communicating with said generating means and said radiating means for coupling wave energy from said generating means to said radiating means, a quarter-wave plate disposed within said waveguide to circularly polarize the electrical field output from said generating means, said radiating means radiating said wave energy into a region of space to be monitored and receiving reflected wave energy therefrom; said radiating and receiving means including a mixer-duplexer assembly to detect any difference frequency between the radiated and reflected wave energy to produce an output signal, and an intruder alarm device actuated by said output signal to announce the presence of an intruder in the monitored region.

6. In a high frequency electromagnetic wave energy intruder alarm system; radio frequency generating means for producing electromagnetic wave energy; means for simultaneously radiating wave energy and receiving reflected wave energy, means including a hollow waveguide for communicating with said generating means and said radiating means for coupling wave energy from said generating means to said radiating means, a quarter-wave plate disposed within said waveguide to circularly polarize the electrical field output from said generating means, said radiating means radiating said wave energy into a region of space to be monitored and receiving reflected wave energy therefrom; said radiating and receiving means including a mixer-duplexer assembly to detect any difference frequency between the radiated and reflected wave energy to produce an output signal, and an intruder alarm device actuated by said output signal to announce the presence of an intruder in the monitored region, wherein said quarter-wave plate comprises, an insulator member, a metal plate carried from said insulator member, said insulator member being secured to the inner wall surface of said waveguide, and said metal plate being disposed in a nonelectrically contacting relationship with said inner wall surfaces of said waveguide.

7. The system according to claim 6 wherein the waveguide includes a pluarlity of mutually opposed, longitudinally directed grooves, one pair of said grooves being positioned such as to securely accommodate the quarter-wave plate with its plane surface inclined at a 45° angle with respect to the polarity of the electrical field output from said generating means.

8. In a high frequency electromagnetic wave energy intruder alarm system; a high frequency wave generating means for producing electromagnetic wave energy; means for simultaneously radiating wave energy into a region to be monitored and receiving reflected wave energy therefrom; means for coupling wave energy from said generating means to said radiating means, means to detect any frequency difference between the radiated wave energy frequency and reflected wave energy frequency coupled to said radiating and receiving means to produce an output signal responsive to the difference frequency, if present; a sampling circuit coupled to said detecting means for sampling said output signal at regular intervals and maintaining the sampled output signal at substantially a constant amplitude; a solid state amplifier circuit coupled to said sampling circuit for presenting a high input impedance to the output signal of said sampling circuit; a detector circuit coupled to said amplifier circuit for detecting only those signals from the amplifier which vary by a preset amplitude; a step-charge circuit coupled to said detector and responsive only to a preset number of consecutive input signals from said detector which build up to a threshold potential in said step-charge circuit, an alarm system coupled to said step-charge circuit and responsive to the threshold potential of said step-charge circuit.

9. The system according to claim 8 wherein said circuit for sampling said output signal includes an electrical transformer having primary and secondary windings including a center tap in its secondary winding; a pulse source for providing a pulse output to the primary winding of said transformer, said detecting means including a mixer-duplexer for providing an output signal to the center tap on said secondary winding, an electric switching means coupled to the output from the secondary of said transformer, an electric storage means coupled to the output from said switching means, said electric switching means being responsive to the pulses from said pulse source whereby the portion of the output signal present on the secondary winding upon receipt of said pulses is coupled through said switching means, said secondary winding output signal being stored on said storage means at a substantially constant amplitude until the receipt of the next signal portion.

10. The system according to claim 8 wherein said solid state amplifier circuit comprises a bridge network formed by a voltage controlled diode capacitor, a capacitor electrically connected to the base plate of said diode capacitor and an inductor having an electrical tap, said inductor being electrically connected to the plate of said diode capacitor opposite the base plate, said bridge network further including a transistor amplifier; the base of said transistor coupled through a coupling capacitor and electrically connected to the base of said diode capacitor, the collector of said transistor electrically connected to the junction of said diode capacitor and said inductor and the emitter of said transistor electrically connected to the center tap on said inductor.

11. The system according to claim 8 wherein detector circuit includes a tunnel diode; limiting means electrically connected to the input of said tunnel diode to limit the amount of signal supplied to said tunnel diode and a voltage divider network electrically connected to the output of said tunnel diode to provide current bias to said tunnel diode thereby regulating the sensitivity of said system by making said tunnel diode responsive only to those input signals which vary by a given amplitude.

12. The system according to claim 8 further including a fail-safe circuit, said fail-safe circuit including a generator for generating a short pulse wave train output signal, an oscillator means coupled to said generator to produce an oscillating output, the output of said oscillator being electrically connected to said high frequency generator to frequency modulate the output from said generator to produce a synthetic fail-safe signal on said radiated wave energy, said fail-safe signal being detected as reflected energy by said means to detect a frequency difference, a fail-safe detector circuit electrically connected to said frequency difference detection means responsive to the fail-safe signal whereby fail-safe signals maintain a threshold potential in said fail-safe detector to prevent the fail-safe alarm from sounding.

13. In a high frequency electromagnetic intruder alarm system, means for producing high frequency wave energy; means for transmitting radiations of said frequency into a space to be monitored; means for receiving reflected wave energy of said radiations; means for detecting variations in the frequency of the received wave energy when compared with the transmitted radiation frequency; indicating means being actuated by variations in the frequencies detected by said detecting means to announce the presence of an intruder in the area being monitored, said indicating means including means for transforming said detected frequency variations, if present, into a series of pulses at a rate of $n$ times 60 cycles per second where $n$ equals an integer whereby reflections from fluorescent lighting fixtures having a large 120 cycle fluctuation are substantially eliminated from the circuit of said indicating means.

14. In a high frequency electromagnetic intruder alarm system, a generator means for producing high frequency wave energy; means for transmitting radiations of said frequency into a space to be monitored; means for receiving reflected wave energy of said radiations; means for detecting variations in the frequency of the received wave energy when compared with the transmitted radiation frequency; indicating means being actuated by variations in the frequencies detected by said detecting means to announce the presence of an intruder in the area being monitored, means connected to said generator means for causing frequency modulated pulses to be produced whereby said frequency modulated pulses provide a series of synthetic frequency pulse of radiation integral with said high frequency wave energy to serve as a fail-safe signal.

15. The system according to claim 14 further including a fail-safe detection circuit electrically responsive to the series of synthetic pulses of radiation, said series of synthetic pulses acting to establish a fail-safe threshold in said detection circuit to prevent the indicating means from being actuated.

References Cited by the Examiner

UNITED STATES PATENTS

| | | | |
|---|---|---|---|
| 2,629,773 | 2/1953 | Hall et al. | 331—31 |
| 2,760,070 | 8/1956 | Keonjian | 331—117 |

(Other references on following page)

UNITED STATES PATENTS

| | | | |
|---|---|---|---|
| 2,782,405 | 2/1957 | Weisz et al. | 340—258 |
| 2,784,315 | 3/1957 | Moleman et al. | 331—117 |
| 2,794,974 | 6/1957 | Bagno et al. | 340—258 |
| 2,833,993 | 5/1958 | Riblet | 333—11 |
| 2,840,787 | 6/1958 | Adcock et al. | 333—11 |
| 2,903,683 | 9/1959 | Bagno | 340—258 |
| 3,031,659 | 4/1962 | Le Parquier | 343—7.7 |
| 3,048,844 | 8/1962 | Ashby | 343—756 |
| 3,066,290 | 11/1962 | Whitehorn | 343—100.3 |
| 3,139,617 | 6/1964 | Denman et al. | 343—8 |
| 3,187,329 | 6/1965 | Midlock | 343—8 |

OTHER REFERENCES

Straube: A Voltage Variable Capacitor, Electronic Industries, July 1958, at pages 77–80.

CHESTER L. JUSTUS, *Primary Examiner.*

R. M. SKOLNIK, T. H. TUBBESING,
*Assistant Examiners.*